United States Patent [19]

Rohr

[11] Patent Number: 4,979,539
[45] Date of Patent: Dec. 25, 1990

[54] SANITARY MIXING VALVE

[76] Inventor: Hans-Josef Rohr, Rosenkreuzstrasse 31, 5507 Neumagen-Dhron, Fed. Rep. of Germany

[21] Appl. No.: 313,938

[22] Filed: Feb. 23, 1989

[51] Int. Cl.⁵ .............................................. F16K 11/02
[52] U.S. Cl. ............................... 137/454.6; 137/625.4; 251/366
[58] Field of Search ............... 137/454.2, 454.5, 625.4, 137/625.17; 251/366, 368

[56] References Cited

U.S. PATENT DOCUMENTS

| | | | |
|---|---|---|---|
| 3,646,966 | 3/1972 | Smart | 137/625.4 |
| 3,938,546 | 2/1976 | Farrell | 137/454.2 |
| 3,951,169 | 4/1976 | Loose | 137/454.2 X |
| 4,682,626 | 7/1987 | Bergmann | 137/625.4 X |
| 4,685,487 | 8/1987 | Derdack et al. | 137/454.5 X |
| 4,722,509 | 2/1988 | Delker et al. | 137/625.4 X |

FOREIGN PATENT DOCUMENTS 3509666  9/1986  Fed. Rep. of Germany.

*Primary Examiner*—John Rivell

[57] ABSTRACT

A sanitary mixing valve is disclosed in which a ceramic body is provided with a valve cartridge mounting means which relieves stresses and other clamping forces when a valve cartridge assembly is mounted in the ceramic body.

5 Claims, 2 Drawing Sheets

SANITARY MIXING VALVE

BACKGROUND OF THE INVENTION

1. Field of the Invention

The invention relates to a sanitary mixing value and, particularly, to a ceramic housing or body having a valve cartridge mounting means positioned therein to which a value cartridge assembly is mounted, the value cartridge assembly having control elements that are adapted to be connected to the water supply lines.

2. Description of Prior Art

In German Letters of Disclosure No. 8,509,666, for example, the housing is in the form of a hollow body having a well-like opening in which the valve cartridge assembly is

SUMMARY OF THE INVENTION

The object of the present invention is to provide a sanitary mixing valve assembly which includes a ceramic valve body structurally designed to house and rigidly mount a valve cartridge assembly therein, and to a mixing valve assembly that is dependable and economical to manufacture According to the invention, a sanitary mixing valve assembly is disclosed in which a ceramic valve body is formed having a well-like opening on one side thereof which houses a valve cartridge assembly and a valve cartridge mounting means, housed within a recess, positioned on the other side thereof, to which the valve cartridge assembly is mounted.

DETAILED DESCRIPTION OF THE PREFERRED EMBODIMENT

Figure 1:
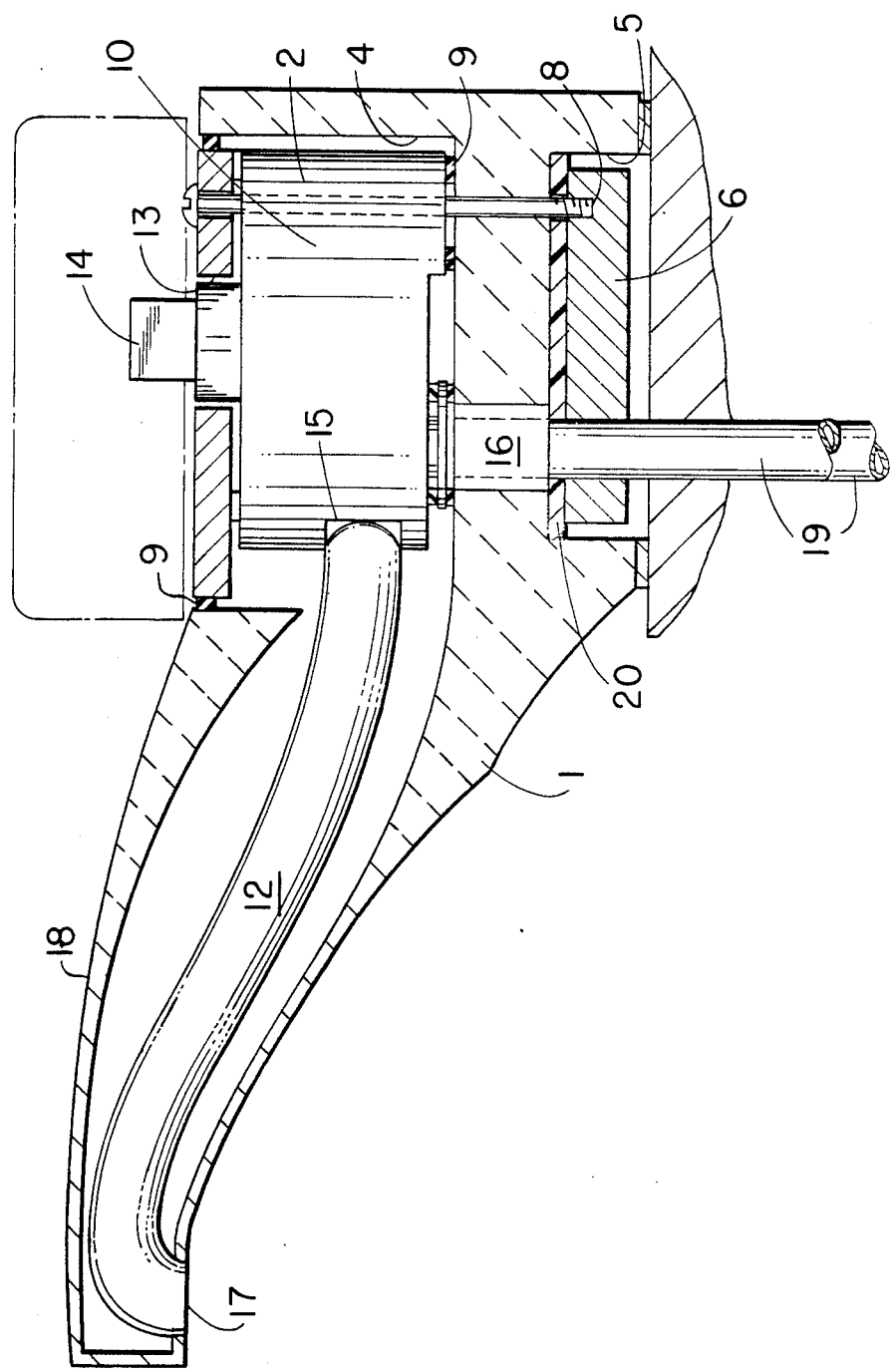
FIG. 1 is an elevational view, partly in section, of a sanitary mixing valve illustrating the present invention.

The invention will now be described in more detail with reference to the drawings In FIGS. 1 and 2, a single-handle mixing valve for lavatories is illustrated with the actuating handle not shown.

Housing or body 1 of the sanitary mixing valve 10 is made of a ceramic material and is formed having a hollow passageway to define an outlet or spout 18 which communicates with a well-like opening 4 in which valve cartridge 2 is housed. Valve cartridge is known per se, and contains the control elements of the valve. Housed within the cartridge body are two polished ceramic discs lying one upon the other, of which one is arranged stationary and the other movable and of which one has openings for hot and cold water inlets and the other affords a lateral water outlet from the cartridge body. The cartridge body includes corresponding hot and cold water openings which are in watertight fluid connection with the water supply lines 19 and the water outlet 15. Actuating lever 14 is operably coupled to the handle and movable disc not shown.

Figure 2:
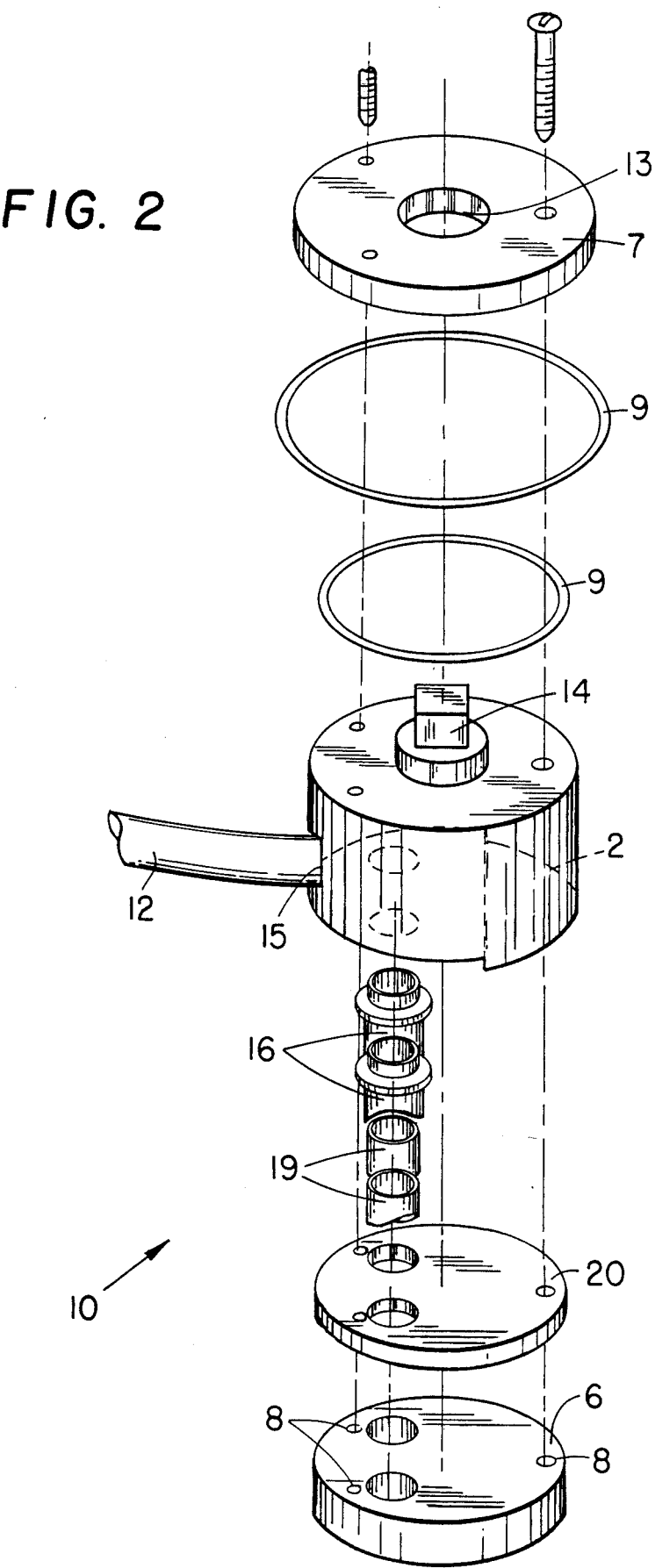
FIG. 2 is an exploded view, in perspective, of the valve cartridge assembly and the valve cartridge mounting means shown in FIG. i, but with the ceramic valve body removed.

In FIG. 1. valve cartridge 2 is positioned in well-like opening 4 of housing 1. Housing 1 is provided with a depression 5 in which valve cartridge means, in the form of a clamp plate 6, is housed. Plate 6, preferably made of metal, is provided with two or more threaded blind holes 8. Cover plate 7 cartridge 2 and housing 1 are provided with corresponding openings formed in plate 6. Two or more screws traverse the openings to engage threaded blind holes 8 of plate 6 so that cartridge 2 and cover plate 7 are rigidly mounted in well-like opening 4. A seal of soft material or a elastic inlay 20 is placed in depression 5, between plate 6 and web "W", to prevent damage to ceramic body 1. Clamp plate 6 and the bottom of housing 1 are traversed by the water supply lines 19 through corresponding openings in ceramic body 1. Care should be taken to have supply lines 19 fit as snug as possible. Therefore, it is desirable to provide sleeves 16 that are fitted in the openings to compensate for tolerances and bending stresses through clamp plate 6. Sleeves 16 are made of an elastomer type seizing material, such as rubber or a suitable plastic. Static O-rings 9 are used as a seal between cover plate 7 and housing as well as cover plate 7 and cartridge 2 to housing 1. O-ring seals 9 are disposed between the bottom of cartridge 2 and housing 1 also.

The control elements in cartridge and the actuating handle, not shown, are coupled through connecting element 14. Connecting element 14 passes through aperture 13 in cover plate 7, which may also be sealed by an O-ring or the like.

A bendable tubing or pipe 12 is housed in outlet 18 and is mounted at one end to discharge outlet 15 of the cartridge housing, and terminates at its other end in spout outlet opening 17 of body 1, as shown in FIG. 1. Outlet opening 17 is preferably precast or may be made by a diamond drill to open spout 18. The exit end of tube or pipe 12 is preferably connected to a jet regulator or a water-air mixer nozzle, not shown.

It is claimed:

1. A sanitary valve assembly comprising:
   a hollow ceramic body of unitary design;
   said ceramic body includes a spout having an open passageway extending between the spout end and a chamber formed in said body;
   said chamber including a base and having openings which are adapted to be coupled to hot and cold water supply conduits;
   a valve cartridge mounting plate disposed in a recess formed in said body and which is in spaced relation to said chamber base;
   said mounting plate having corresponding water inlet openings aligned in watertight communication with said water inlet openings in said chamber base;
   a valve cartridge assembly disposed in said chamber and coupled to said mounting plate, said cartridge having hot and cold water inlet openings and being in fluid tight communication with said water inlet openings in said chamber base and said mounting plate;
   said valve cartridge assembly having an outlet opening communicating with said spout passageway; and
   valve control means to operate said sanitary valve.

2. The sanitary valve assembly of claim 1 wherein said valve assembly includes a cover plate mounted in sealed relation to said chamber formed in said valve body.

3. The sanitary valve assembly of claim 2 wherein said cover plate and said valve cartridge are mounted in said ceramic body by a plurality of threaded bolts threadedly coupled to said mounting plate.

4. The sanitary valve assembly, as set forth in claim 1, wherein said mounting plate includes an elastic liner positioned between said mounting plate and said recess.

5. The sanitary valve assembly, as set forth in claim 1, wherein said ceramic body included a conduit disposed in said spout, the ends of which are mounted in watertight relation with said outlet opening in said valve cartridge assembly.

* * * * *